United States Patent
Henning et al.

(10) Patent No.: US 8,349,907 B2
(45) Date of Patent: Jan. 8, 2013

(54) INVENTION RELATES TO THE USE OF FOAM STABILIZERS, PRODUCED ON THE BASIS OF SUSTAINABLE RAW MATERIALS, FOR PRRODUCING POLYURETHANE FOAMS

(75) Inventors: Frauke Henning, Essen (DE); Wilfried Knott, Essen (DE); Oliver Thum, Ratingen (DE); Carsten Schiller, Mülheim an der Ruhr (DE); Martin Glos, Borken (DE); Annegret Terheiden, Duisburg (DE)

(73) Assignee: Evonik Goldschmidt GmbH, Essen (DE)

( * ) Notice: Subject to any disclaimer, the term of this patent is extended or adjusted under 35 U.S.C. 154(b) by 56 days.

(21) Appl. No.: 12/867,096

(22) PCT Filed: Dec. 15, 2008

(86) PCT No.: PCT/EP2008/067500
§ 371 (c)(1), (2), (4) Date: Oct. 26, 2010

(87) PCT Pub. No.: WO2009/100793
PCT Pub. Date: Aug. 20, 2009

(65) Prior Publication Data
US 2011/0034576 A1   Feb. 10, 2011

(30) Foreign Application Priority Data
Feb. 11, 2008   (DE) .......................... 10 2008 000 266

(51) Int. Cl.
*C08G 77/46* (2006.01)
(52) U.S. Cl. ........ 521/112; 521/110; 521/114; 521/121; 521/170
(58) Field of Classification Search .................. 521/110, 521/112, 121, 170, 114
See application file for complete search history.

(56) References Cited

U.S. PATENT DOCUMENTS

| | | | | |
|---|---|---|---|---|
| 4,309,508 A | * | 1/1982 | Baskent et al. | 521/112 |
| 5,306,737 A | * | 4/1994 | Burkhart et al. | 521/112 |
| 6,465,673 B1 | | 10/2002 | Imperante et al. | |
| 6,653,362 B2 | * | 11/2003 | Toyota et al. | 521/174 |
| 8,034,848 B2 | * | 10/2011 | Landers et al. | 521/112 |
| 2007/0093565 A1 | * | 4/2007 | Glos et al. | 521/112 |

FOREIGN PATENT DOCUMENTS

| | | | |
|---|---|---|---|
| DE | 10 2006 038661 | * | 2/2008 |
| EP | 0585771 | | 3/1994 |
| WO | WO 02/069765 | * | 12/2002 |

* cited by examiner

*Primary Examiner* — John Cooney
(74) *Attorney, Agent, or Firm* — Frommer Lawrence & Haug LLP

(57) ABSTRACT

Preparation and use of polyurethane foams with the use of foam stabilizers of the general formula (I)

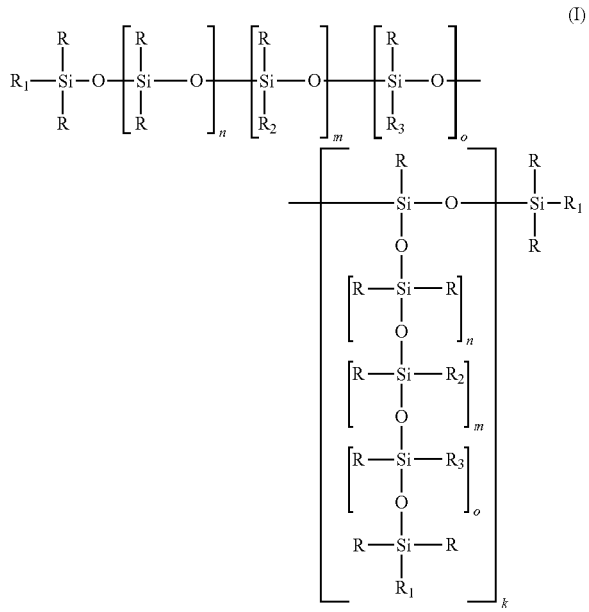

12 Claims, No Drawings

INVENTION RELATES TO THE USE OF FOAM STABILIZERS, PRODUCED ON THE BASIS OF SUSTAINABLE RAW MATERIALS, FOR PRRODUCING POLYURETHANE FOAMS

The invention relates to the use of foam stabilizers which are prepared on the basis of renewable raw materials for the preparation of polyurethane foams Polyurethanes of different type are prepared by the polymerization of diisocyanates, such as 4,4'-methylene bis(phenylisocyanate), MDI for short, or 2,4-toluene diisocyanate, TDI for short, with polyetherpolyols or polyesterpolyols. The polyetherpolyols used here are obtained by the alkoxylation of polyhydroxy-functional initiators, such as, for example, glycols, glycerol, trimethylolpropane, pentaerythritol, sorbitol or sucrose. In the preparation of polyurethane foams, additional blowing agents are used, such as, for example, pentane, methylene chloride or carbon dioxide. The stabilization of the polyurethane foam by a surfactant is indispensable for reproducible industrial production of foam parts. Apart from a few purely organic surfactants, silicone surfactants are generally used owing to their higher interfacial stabilization potential.

With a view to the limited availability of fossil resources, namely oil, coal and gas, in the long term and against the background of rising crude oil prices, there is the need to changeover the production of chemical products substantially so that it is based on renewable raw materials. As is evident from WO 2005/033167 A2 or US 2006/0293400 A1, polyurethane foams can already be manufactured using polyols which are prepared from renewable raw materials, such as, for example, vegetable oils and vegetable fats. The requirements regarding the efficiency of the foam stabilizer are higher in these systems in that the composition and technical purity of the plant-based raw materials are subject to greater variations than is the case with pure industrial products. In the documents cited, efficient silicone surfactants, such as, for example, silicone-polyether copolymers, are used, which silicone surfactants are established on the market, such as, for example, Tegostab B 2370, Tegostab B 4690 LF, Tegostab B 8681 or Tegostab B 4351.

PRIOR ART

The prior art describes a multiplicity of different polyurethane foams, for example hot flexible foam, cold foam, ester foam, rigid PU foam, rigid PIR foam, etc. The stabilizers used here are developed so as to be perfectly tailored for the respective end use and usually show a substantially changed performance if they are used for the preparation of other foam types.

In the preparation of rigid polyurethane and polyisocyanurate foams, cell-stabilizing additives are used in order to obtain a fine-celled, uniform foam structure having few defects and therefore positively to influence the performance characteristics—in particular the thermal insulation capacity—of the rigid foam to a substantial extent. Here too, surfactants based on polyether-modified siloxanes are particularly effective and therefore represent the preferred type of cell stabilizers. Since there is a multiplicity of different rigid foam formulations for different fields of use, which set individual requirements regarding the cell stabilizer, polyether siloxanes of different structures are used. In many fields of use, improvements of the cell stabilizers compared with the prior art are desirable in order further to optimize the performance characteristics of the rigid foams, in particular with regard to the thermal conductivity and the foam defects at the surface of the foams. Further criteria important in the preparation of rigid foams are the flowability and volume yield of the foam in the case of a given formulation and amount of blowing agent. These parameters, too, can be positively influenced by the choice of an optimized stabilizer. Thus, for example, the choice of the blowing agent has influenced the developments of novel, optimized stabilizers. While EP 0570174 A1 also describes the preparation of rigid polyurethane foam using chloro-fluorocarbons, the further development proceeds via pure fluorocarbons as blowing agents, as described in EP 0533202 A1, to the blowing agent pentane routinely used nowadays, as described in EP 1544235 A1.

Flexible polyurethane foams are frequently prepared using carbon dioxide as an environmentally friendly blowing agent. EP 0797606 A1 and EP 1501889 A1 describe the stabilizers customary for this application. In countries with less strict environmental regulations, methylene chloride is nevertheless still used as a blowing agent. EP 0694585 A2 describes stabilizers in use here.

EP 0930324 A1 describes trisiloxane surfactants which are used in combination with foam stabilizers as cell-opening cosurfactants in the preparation of rigid polyurethane foam and flexible polyurethane foam, especially of ester foam based on polyesterpolyols. The trisiloxane surfactants described in EP 0930324 A1 are prepared by reacting trisiloxane-polyoxyalkenols with cyclic dicarboxylic acid anhydrides, which leads to a terminal carboxyl function or a terminal carboxylate salt. Similar structures are described in U.S. Pat. No. 3,560,544 A1, EP 0220697 A2 and U.S. Pat. No. 5,248,783 A1. The effect of the free fatty acid not bound to a silicone surfactant is described in WO 1988002383 A1. All structures described in these documents contain a reactive group which is incorporated into the urethane matrix by reaction and hence reduces the interfacial activity of the cell-opening cosurfactant with progressive urethanization reaction. Only the use, according to the invention, of trisiloxane-polyoxy-alkenols which are completely esterified with naturally occurring fatty acids and have no functional group reacting with the urethane matrix ensures the migratability of the cell-opening cosurfactant and hence the action thereof over the entire period of polyurethane foam preparation, in particular, however, at the time of cell opening.

The documents JP 07070430 B4 and JP 07070550 B4 describe a two-component polyurethane foam which is used for the sealing and adhesive bonding of components and which contains, as a stabilizer, a polyethersiloxane which is prepared on the basis of only one polyether and the polyether-terminal hydroxyl functions of which are esterified with a fatty acid, such as, for example, the isostearic acid cited there. The Japanese documents are limited here to a block copolymer which consists only of two components, namely the siloxane moiety and a polyether completely endcapped with a fatty acid. The preparation and use of polyethersiloxanes which contain both endcapped and hydroxyl-functional polyethers of different molecular weights and different polarities in a block copolymer are not described.

The esterification of allylpolyethers leads under the classical reaction conditions, i.e. with acid catalysis and water separation at high temperatures, to undesired secondary reactions, such as, for example, the oxidative degradation of the allylpolyethers accompanied by odour development and discoloration. In particular, unsaturated fatty acids can be crosslinked by secondary reactions at the double bond. Hydroxy-functional polyethersiloxanes likewise cannot be esterified by classical methods since the silicone chain is cleaved and degraded under the acid catalysis at high temperatures. The method of enzymatically catalysed esterification of hydroxyalkyl-functional polysiloxanes, described in US 2007/0021578 A1, permits a gentler reaction without undesired secondary reactions and odour formation, but refers in all examples to only completely esterified products which are modified with only a few (one or two) organic groups. An enzymatically catalysed partial esterification of polyethersiloxanes or of siloxanes modified with hydroxyalkyl groups cannot be carried out reproducibly with the required precision of formulation, especially with the use of siloxanes which carry a relatively large number of functional groups as comb groups. The attempt to effect subsequent partial esterification can lead to two-phase products in which the completely esterified moieties separate from the product mixture (cf. Example 10). According to the prior art to date, partially esterified polyethersiloxanes are obtainable only by the process described in EP 1816154 A1 (cf. Example 11).

EP 0585771 A2 discloses that the polysiloxane-polyoxyalkylene block copolymers which are particularly efficient foam stabilizers are characterized by a combination of hydroxyl-functional and endcapped polyoxyalkylene blocks of different molecular weight and different hydrophilicity or lipophilicity, which combination can only be determined empirically. Only an exactly tailored ratio of hydrophilic, lipophilic and siliconophilic polymer blocks imparts to the stabilizer its optimum effect in the respective application. Experience teaches that raw material-related variations of the hydrophilic, lipophilic and siliconophilic moieties in the polysiloxane-polyoxyalkylene block copolymer can result in poorer compatibilization of the foam stabilizer with the reacting polyurethane matrix, which can impede homogeneous distribution of the surfactant and subsequent migration to the interface so that a foam collapse is the direct consequence.

It was therefore the technical object to prepare foam stabilizers at least partly based on renewable raw materials, the efficiency of which is comparable with and/or even superior to the established silicone-polyether copolymers of purely petrochemical origin. In a further development, it is the technical object to develop a synthetic route to foam stabilizers based on silicone-polyether copolymers which have, in their polyether moiety, both free hydroxyl groups and hydroxyl termini esterified with acyl radicals originating from natural raw materials.

Surprisingly, it has now been found that not only can a performance equivalent to the established silicone surfactants be achieved with foam stabilizers based on naturally occurring fatty acids in the preparation of polyurethane foams but that in addition, in some foam types, advantages in terms of the performance characteristics, such as, for example, a higher cell fineness in the hot flexible foam, can be realized and/or an increase in the proportion of polyols from renewable raw materials in the respective formulation or a complete substitution of the petrochemicals-based polyol by polyols from renewable raw materials can be realized without the physical properties of the polyurethane foam being adversely affected.

SUBJECT OF THE INVENTION

The invention relates to the preparation of polyurethane foams using foam stabilizers which are prepared at least partly on the basis of renewable raw materials. The foam stabilizers used are polysiloxane-polyoxyalkylene copolymers of the following structure:

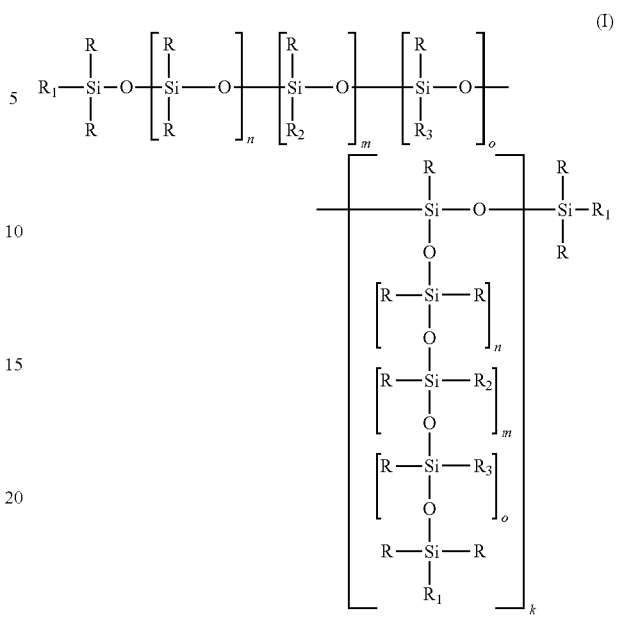

in which
n is 0-500, preferably 10-200, in particular 15-100,
m is 1-60, preferably 1-30, in particular 1-25,
o is 0-60, preferably 0-30, in particular 0-25
k is 0-10, preferably 0-3,
R may be a linear, cyclic or branched, aliphatic or aromatic, saturated or unsaturated hydrocarbon radical having 1 to 20 C atoms, which may contain heteroatoms, such as oxygen, nitrogen, phosphorus or sulphur, but which is preferably a methyl group,
$R_1$ is R, $R_2$ or $R_3$,
$R_2$ is $CH_2$—$CH_2$—$CH_2$—O—$(CH_2$—$CH_2O$—$)_x$—$(CH_2$—$CH(R")O$—$)_y$—$C(O)$—R', in which R' represents the alkyl radical derived from monobasic fatty acids based on natural vegetable or animal oils having 6-30 carbon atoms, in particular having 8-22 carbon atoms, such as caproic acid, caprylic acid, capric acid, lauric acid, myristic acid, palmitic acid, palmitoleic acid, isostearic acid, stearic acid, 12-hydroxy-stearic acid, dihydroxystearic acid, oleic acid, linoleic acid, petroselinic acid, elaidic acid, arachidic acid, behenic acid, erucic acid, gadoleic acid, linolenic acid, eicosapentaenoic acid, docosahexaenoic acid, arachidonic acid, which can be used alone or as a mixture; the alkyl radical derived from polycondensation products of hydroxy-functionalized acids, for example poly-12-hydroxystearic acid or polyricinoleic acid, can likewise be used as radical R';
$R_3$ is $CH_2$—$CH_2$—$CH_2$—O—$(CH_2$—$CH_2O$—$)_x$—$(CH_2$—$CH(R")O$—$)_y$—R''', $CH_2$—$CH_2$—O—$(CH_2$—$CH_2O$—$)_x$—$(CH_2$—$CH(R")O$—$)_y$—R''', $CH_2$—$CH_2$—$CH_2$—O—$(CH_2$—$CH_2O$—$)_x$—$(CH_2$—$CH(R")O$—$)_y$—$(SO)_z$—R''', $CH_2$—$R^{IV}$,
$CH_2$—$CH_2$—$(O)_x'$—$R^{IV}$,
$CH_2$—$CH_2$—$CH_2$—O—$CH_2$—$CH(OH)$—$CH_2OH$

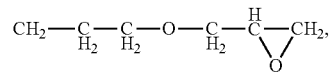

CH$_2$—CH$_2$—CH$_2$—O—CH$_2$—C(CH$_2$OH)$_2$—CH$_2$—CH$_3$, in which x is 0 to 100, x' is 0 or 1, y is 0 to 100, z is 0 to 100, R" is an optionally substituted alkyl group having 1 to 4 C atoms and R'" denotes a hydrogen radical or an alkyl group having 1 to 4 C atoms; the group —C(O)—R"; an alkylaryl group, such as the benzyl group; the group —C(O)NH—R', R$^{IV}$ is an optionally substituted, e.g. halogen-substituted, hydrocarbon radical having 1 to 50, preferably 9 to 45, preferably 13 to 37, C atoms and SO denotes the radical —CH(C$_6$H$_5$)—CH$_2$—O—.

The various monomer units of both the siloxane chain and the polyoxyalkylene chain may have a blockwise structure with one another or may also be subject to a random distribution.

The index numerals reproduced in the formulae mentioned here and the value ranges of said indices are therefore understood as the mean values of the possible random distribution of the actual isolated structures and/or the mixtures thereof. This also applies to structural formulae reproduced exactly as such per se, for example, to formula (II) in Example 9.

Further subjects of the invention are characterized by the contents of the subclaims.

The polysiloxane-polyoxyalkylene block copolymers on which the invention has been based can be prepared as described in the prior art. Thus, for example, a mixture of different allylpolyethers having different molecular weights and alkylene oxide contents, which are partly or completely esterified with fatty acids under enzymatic catalysis, can be linked by platinum-catalysed hydrosilylation to a terminal and/or side SiH-functional polydimethylsiloxane via SiC bond formation. The patent application EP 1816154 A1, in which such an esterification as well as hydrosilylation is described by way of example, is hereby introduced as a reference and is considered to be part of the disclosure content of the present invention.

The hydrogensiloxanes used in the preparation of the polysiloxane-polyoxyalkylene block copolymers can likewise be prepared as described in the prior art, for example in EP 1439200 B1. The unsaturated polyoxy-alkylenes used can be prepared by the process of the alkaline alkoxylation of allyl alcohol which is known from the literature or with the use of DMC catalysts, as described, for example, in U.S. Pat. No. 5,877,268.

The preparation of the polyurethane foams according to the invention can be effected with formulations and procedures known in the prior art, with in each case foams prepared in parallel with addition of established foam stabilizers as a reference.

The foam stabilizers according to the invention and the use thereof are described by way of example below without it being intended to limit the invention to these exemplary embodiments. Where ranges, general formulae or classes of compounds are stated below, these are intended to comprise not only the corresponding ranges or groups of compounds which are explicitly mentioned but also all partial ranges and partial groups of compounds which can be obtained by removing individual values (ranges) or compounds. Where documents are cited in the present description, the content thereof is intended to belong completely to the disclosure content of the present invention.

WORKING EXAMPLES

In the examples mentioned below, the present invention is described by way of example without it being intended to limit the invention, the range of use of which is evident from the entire description and the claims, to the embodiments mentioned in the examples.

In the examples, the platinum catalyst used is the Karstedt catalyst, a divinyltetramethyldisiloxane-platinum[0] catalyst.

Example 1

According to the Invention

In a 500 ml four-necked flask with a connected KPG stirrer, reflux condenser and internal thermometer, 80.0 g of an allylpolyethylene glycol enzymatically esterified with forerun fatty acid (commercially available fatty acid mixture substantially comprising octanoic and decanoic acid, for example Edenor V85 from Cognis GmbH) and having an average molecular weight of 746 g/mol are heated to 70° C. with 64.8 g of an allylpolyethylene glycol having an average molecular weight of 604 g/mol and 45 g of a poly(methylhydrogen)dimethylsiloxane copolymer having a proportion of 3.5 eq/kg of hydrogen with stirring. 5 ppm of a platinum catalyst are added and, after a reaction time of two hours, are supplemented by a further 5 ppm. The gas volumetrically determined conversion is quantitative after 3.5 hours. The clear pale yellow product has a viscosity of 527.8 mPa·s and is suitable, for example, as a polyurethane foam stabilizer, preferably for the preparation of rigid polyurethane foam.

Example 2

According to the Invention

In a 500 ml four-necked flask with a connected KPG stirrer, reflux condenser and internal thermometer, 80.6 g of an allylpolyethylene glycol enzymatically esterified with palmitostearic acid (commercially available fatty acid mixture substantially comprising palmitic and stearic acid, for example Edenor ST1 from Cognis GmbH, Kortacid PT10 from Akzo Nobel or SA 18/65 of Peter Cremer GmbH) and having an average molecular weight of 846 g/mol are heated to 70° C. with 57.6 g of an allylpolyethylene glycol having an average molecular weight of 604 g/mol and 40 g of a poly(methylhydrogen)-dimethylsiloxane copolymer having a proportion of 3.5 eq/kg of hydrogen with stirring. 5 ppm of a platinum catalyst are added. The gas volumetrically determined conversion is quantitative after 2 hours. The clear pale yellow product has a viscosity of 643.4 mPa·s and is suitable, for example, as a polyurethane foam stabilizer, preferably for the preparation of rigid polyurethane foam.

Example 3

According to the Invention

In a 500 ml four-necked flask with a connected KPG stirrer, reflux condenser and internal thermometer, 133.3 g of an allylpolyethylene glycol enzymatically esterified with forerun fatty acid (commercially available fatty acid mixture substantially comprising octanoic and decanoic acid, for example Edenor V85 from Cognis GmbH) and having an average molecular weight of 746 g/mol are heated to 70° C. with 37.5 g of a poly(methylhydrogen)dimethylsiloxane copolymer having a proportion of 3.5 eq/kg of hydrogen with stirring. 5 ppm of a platinum catalyst are added. The gas volumetrically determined conversion is quantitative after 2 hours. The clear pale yellow product has a viscosity of 384.1 mPa·s and is suitable, for example, as a polyurethane foam stabilizer, preferably for the preparation of rigid polyurethane foam.

Example 4

According to the Invention

In a 500 ml four-necked flask with a connected KPG stirrer, reflux condenser and internal thermometer, 114.5 g of an allylpolyethylene glycol enzymatically esterified with forerun fatty acid (commercially available fatty acid mixture substantially comprising octanoic and decanoic acid, for example Edenor V85 from Cognis GmbH) and having an average molecular weight of 540 g/mol are heated to 70° C. with 35.3 g of 1,1,1,3,5,5,5-heptamethyltrisiloxane having a proportion of 4.45 eq/kg of hydrogen with stirring. 5 ppm of a platinum catalyst are added. The temperature increases to 81° C. The gas volumetrically determined conversion is quantitative after 2 hours. The clear pale yellow product has a viscosity of 35 mPa·s and is suitable, for example, as a polyurethane foam stabilizer, preferably for the preparation of polyurethane ester foam.

Example 5

According to the Invention

In a 500 ml four-necked flask with a connected KPG stirrer, reflux condenser and internal thermometer, 122.5 g of an allylpolyethylene glycol enzymatically esterified with forerun fatty acid (commercially available fatty acid mixture substantially comprising octanoic and decanoic acid, for example Edenor V85 from Cognis GmbH) and having an average molecular weight of 747 g/mol are heated to 70° C. with 27.3 g of 1,1,1,3,5,5,5-heptamethyltrisiloxane having a proportion of 4.45 eq/kg of hydrogen with stirring. 5 ppm of a platinum catalyst are added. The temperature increases to 85° C. The gas volumetrically determined conversion is quantitative after 2 hours. The clear pale yellow product has a viscosity of 57 mPa·s and is suitable, for example, as a polyurethane foam stabilizer, preferably for the preparation of polyurethane ester foam.

Example 6

Not According to the Invention

In a 500 ml four-necked flask with a connected KPG stirrer, reflux condenser and internal thermometer, 119.2 g of an allylpolyethylene glycol esterified with acetic acid or acetic anhydride by methods known from the literature (cf. Organikum) and having an average molecular weight of 644 g/mol are heated to 70° C. with 30.8 g of 1,1,1,3,5,5,5-heptamethyltrisiloxane having a proportion of 4.45 eq/kg of hydrogen with stirring. 5 ppm of a platinum catalyst are added. The temperature increases to 80° C. The gas volumetrically determined conversion is quantitative after 2 hours. The clear pale yellow product has a viscosity of 56 mPa·s.

Example 7

Not According to the Invention

In a 500 ml four-necked flask with a connected KPG stirrer, reflux condenser and internal thermometer, 195.8 g of an allylpolyoxyalkylene esterified with acetic acid by methods known from the literature and having an average molecular weight of 2046 g/mol, a proportion of 54% of propylene oxide and a proportion of 46% of ethylene oxide are heated to 70° C. with 51 g of a poly(methylhydrogen)dimethylsiloxane copolymer having a proportion of 1.39 eq/kg of hydrogen with stirring. 5 ppm of a platinum catalyst are added. The gas volumetrically determined conversion is 99% after 8.5 hours.

Example 8

According to the Invention

In a 500 ml four-necked flask with a connected KPG stirrer, reflux condenser and internal thermometer, 53.1 g of an allylpolyoxyalkylene enzymatically esterified with forerun fatty acid (commercially available fatty acid mixture substantially comprising octanoic and decanoic acid, Edenor V85 from Cognis GmbH) and having an average molecular weight of 2884 g/mol, a proportion of 75% of propylene oxide and a proportion of 25% of ethylene oxide are heated to 70° C. with 150.5 g of an allylpolyoxyalkylene esterified with acetic acid by methods known from the literature and having an average molecular weight of 2046 g/mol, a proportion of 54% of propylene oxide and a proportion of 46% of ethylene oxide and 49.0 g of a poly(methylhydrogen)dimethylsiloxane copolymer having a proportion of 1.39 eq/kg of hydrogen with stirring. 5 ppm of a platinum catalyst are added. The gas volumetrically determined conversion is quantitative after 8 hours. The product is suitable, for example, as a polyurethane foam stabilizer, preferably for the preparation of flexible polyurethane foam.

Example 9

According to the Invention

In a 500 ml four-necked flask with a connected KPG stirrer, reflux condenser and internal thermometer, 121.8 g of an allylpolyoxyalkylene enzymatically esterified with forerun fatty acid (commercially available fatty acid mixture substantially comprising octanoic and decanoic acid, for example Edenor V85 from Cognis GmbH) and having an average molecular weight of 2884 g/mol, a proportion of 75% of propylene oxide and a proportion of 25% of ethylene oxide are heated to 70° C. with 86.4 g of an allylpolyoxyalkylene esterified with acetic acid by methods known from the literature and having an average molecular weight of 2046 g/mol, a proportion of 54% of propylene oxide and a proportion of 46% of ethylene oxide and 45.0 g of a poly(methylhydrogen)dimethylsiloxane copolymer having a proportion of 1.39 eq/kg of hydrogen with stirring. 5 ppm of a platinum catalyst are added. The gas volumetrically determined conversion is quantitative after 8 hours. The product is suitable, for example, as a polyurethane foam stabilizer, preferably for the preparation of flexible polyurethane foam.

Preparation of Rigid Polyurethane Foam:

The polyorganosiloxanes according to the invention are suitable for use as a cell stabilizer in rigid polyurethane and polyisocyanurate foams, as shown by a comparison of the performance characteristics with those of conventional polyethersiloxanes which represent the prior art. A typical formulation for the preparation of rigid polyurethane or polyisocyanurate foams is based on one or more organic isocyanates having two or more isocyanate functions, one or more polyols having two or more groups reactive towards isocyanate, catalysts for the isocyanate-polyol and/or isocyanate-water reactions and/or the isocyanate trimerization, polyethersiloxane cell stabilizers, water, optionally physical blowing agents, optionally flameproofing agents and, if appropriate, further additives. The following foam formulation was used for the comparison of the performance characteristics of cell stabilizers according to the invention with those of conventional cell stabilizers:

| Component | Amount used |
| --- | --- |
| Polyetherpolyol* | 95 g (100 parts) |
| DMCHA | 1.4 g (1.5 parts) |
| Water | 2.5 g (2.6 parts) |
| Cyclopentane | 12.4 g (13.1 parts) |
| Stabilizer | 1.4 g (1.5 parts) |
| MDI** | 188.6 g (198.5 parts) |

*Daltolac R 471 from Huntsman
**Polymeric MDI, 200 mPa · s, 31.5% of NCO, functionality 2.7

The comparative expansions were carried out by the manual mixing method. For this purpose, polyol, catalysts, water, conventional foam stabilizer or foam stabilizer according to the invention and blowing agent were weighed into a beaker and mixed with a disc stirrer (6 cm diameter) for 30 s at 1000 rpm. The amount of blowing agent evaporated during the mixing process was determined by reweighing and was replenished. The MDI was now added and the reaction mixture was stirred for 5 s at 3000 rpm with the stirrer described and immediately transferred to an aluminium mould thermostated at 45° C. and measuring 145 cm×14 cm×3.5 cm, which was inclined at an angle of 10° (along the side measuring 145 cm) and was lined with polyethylene film. The foam formulation was introduced on the lower side so that the expanding foam fills the mould in the feed region and rises in the direction of the higher side. The amount of foam formulation used was such that it was below the amount required for a minimum filling of the mould. The length of the shaped foam article obtained after curing can thus be used—standardized to the weight—as a measure of the volume yield.

After 10 min, the foams were removed from the mould and analysed. Their surface appearance and the occurrence of internal defects were assessed subjectively with the aid of reference expansions based on a scale of 1 to 10, 10 representing a defect-free foam and 1 representing a foam having an extremely large number of defects. The pore structure (average number of cells per 1 cm) was also assessed on a cut surface optically by comparison with comparative foams. The flow length (as a measure of the volume yield) was determined by measuring the shaped foam article and converted to a standard rate of 260 g and atmospheric pressure for better comparison, according to the following formula:

reduced flow length=foam length·260 g·air pressure/
(foam weight·1013 mbar)

All cell stabilizers used and the associated expansion results are listed in Table 1.

TABLE 1

| Cell stabilizer | Foam quality with regard to defects | | | Cell fineness [cells/cm] | Reduced flow length [cm] |
| --- | --- | --- | --- | --- | --- |
| | Top | Bottom | Interior | | |
| TEGOSTAB B 8404* | 4 | 4.5 | 7 | 36-40 | 128.5 |
| Working Example 1 | 5.5 | 5 | 7 | 36-40 | 129.9 |
| Working Example 2 | 4.5 | 4 | 6.5 | 36-40 | 126.5 |
| Working Example 3 | 4.5 | 4.5 | 6.5 | 36-40 | 129.6 |

*Polyethersiloxane cell stabilizer for rigid polyurethane foam applications from Evonik Goldschmidt GmbH The results show that rigid foams can be prepared with the polyethersiloxanes according to the invention. Compared with conventional polyethersiloxanes (prior art), equally good results are obtained with regard to cell fineness and even better results (Working Example 1) with regard to surface quality and flowability or volume yield.

Examples for the preparation of flexible polyester-polyurethane foam:

Polyester-polyurethane foams are prepared by reacting a reaction mixture consisting of a) a polyesterpolyol which carries on average at least two hydroxyl groups per molecule, b) a polyisocyanate which carries on average at least two isocyanate groups per molecule, the polyol and the polyisocyanate accounting for the greatest part of the reaction mixture and the ratio of the two components to one another being suitable for preparing a foam, c) a blowing agent in small amounts which is sufficient for the expansion of the reaction mixture, d) a catalytic amount of a catalyst for the preparation of the polyurethane foam, which generally consists of one or more amines, and e) a small amount of a foam stabilizer consisting of organo-modified siloxanes and/or other surfactants which sufficiently stabilizes the expanding mixture.

Thus, the organo-modified siloxanes of the general formula (I) can also be used alone or in combination with non-Si-containing surfactants as a stabilizer. The organo-modified siloxanes of the general formula (I) can also be diluted in suitable solvents in order to simplify the meterability or to improve the incorporability into the reaction mixture.

Further additives may be: flameproofing agents, cell openers, dyes, UV stabilizers, substances for preventing microbial infestation and further additives which are obvious to a person skilled in the art and are not further mentioned here.

The polyesterpolyols, isocyanates, blowing agents, flameproofing agents, catalysts, additives and preparation processes known according to the prior art can be used. For example, the components mentioned in the patent EP 0048984, which is hereby mentioned as a reference, can be used.

Raw materials: Desmophen 2200 from Bayer, toluene diisocyanate (TDI 80/20) from Bayer, N-methylmorpholine (NMM).

Formulation: 100 parts of polyesterpolyol, 56.5 parts of TDI 80, 5.1 parts of water, 1.4 parts of NMM, 0.13 or 0.26 part of a foam stabilizer.

An activator solution was prepared from water, amine and foam stabilizer with addition of 0.5 part of a polyether with 90% of PO and 10% of EO and an average molar mass of 2000 g/mol as a solubilizer and 0.5 part of a polyoxyethylene sorbitol oleate-laurate (trade name: TEGO PEG 30 Tol from Evonik Goldschmidt GmbH).

The expansion was carried out on a high-pressure machine from Hennecke, model UBT, with an output of 4 kg/min. The polyol, the isocyanates and the activator solution were metered separately. The reaction mixture was metered into a paper-lined container having a base area of 30×30 cm. The height of rise and the collapse were determined.

Collapse is defined as the decrease in the height of rise 1 minute after reaching the maximum height of rise. After curing of the foams, the cell count and the air permeability were determined. The air permeability is a measure of the proportion of open cells in the foam. For many applications, a foam which is as open-celled as possible is desired. The open-celled character of the foams was determined here via the air permeability. The air permeability is stated in mm dynamic pressure (water column) which builds up if a constant air stream is passed through the foam. The higher the stated value, the more closed-cell in character is the foam, and vice versa.

The results of the preparation of flexible polyester-polyurethane foams using the foam stabilizers of the general formula (I) according to the invention (Working Examples 4 and 5) and using an organo-modified siloxane known in the prior art as a foam stabilizer (Comparative Example 6) are summarized in Table 2 below.

The foam stabilizer used and the amount thereof used (in parts), the foam height (cm), the collapse (cm), the air permeability (AP in mm) and the cell count ($cm^{-1}$) of the foams obtained are shown.

TABLE 2

| Foam stabilizer | Amount (parts) | Foam height (cm) | Collapse (cm) | AP (mm) | Cell count ($cm^{-1}$) | Remarks |
|---|---|---|---|---|---|---|
| Working Example 4 | 0.2 | 29.3 | 0.6 | 29 | 12 | defect-free |
| Working Example 5 | 0.2 | 29.2 | 1.0 | 34 | 13 | defect-free |
| Comparative Example 6 | 0.2 | 28.9 | 0.9 | 34 | 12 | satisfactory |

Table 2 shows that Working Examples 4 and 5 according to the invention lead to results comparable with those which can be expected in the case of a stabilizer based on purely petrochemical raw materials. The foams resulting on concomitant use of the foam stabilizers according to the invention show at least comparable and in some cases improved product properties. The foam stabilizers according to the invention are thus a very good alternative to the petrochemical foam stabilizers.
Examples for the Preparation of Hot Flexible Polyurethane Foam:

The polyorganosiloxanes according to the invention are suitable for use as a foam stabilizer in the case of flexible polyurethane foams, as shown by a comparison of the performance characteristics with those of conventional polyethersiloxanes which represent the prior art. A typical formulation for the preparation of flexible polyurethane foams is based on one or more organic isocyanates having two or more isocyanate functions, one or more polyols having two or more groups reactive towards isocyanate, catalysts for the isocyanate-polyol and/or isocyanate-water reactions and/or the isocyanate trimerization, polyethersiloxane foam stabilizers, water, optionally physical blowing agents, optionally flameproofing agents and, if appropriate, further additives.

For the comparison of the performance characteristics of foam stabilizers according to the invention with those of conventional foam stabilizers, a flexible polyurethane foam was produced in an open wooden box measuring 27 cm×27 cm and having a wall height of 27 cm by expansion of a polyurethane formulation comprising the following constituents:

| 100 parts | of trifunctional polypropylene glycol, Desmophen VPPU 20 WB 01 from Bayer Material Science AG |
| 5.0 parts | of water |
| 0.15 part | of amine catalyst *1 |
| 0.23 part | of tin catalyst *2 |
| 5.0 parts | of a physical blowing agent (dichloromethane) |
| 63.04 parts | of toluene diisocyanate (TDI 80/20) from Bayer Material Science AG |
| 0.8 part or 1.0 part | of foam stabilizer |

*1 TEGOAMIN ® 33, obtainable from Evonik Goldschmidt GmbH; this is a 33% strength solution of triethylenediamine in dipropylene glycol
*2 KOSMOS ® 29, obtainable from Evonik Goldschmidt GmbH; this is the tin(II) salt of ethylhexanoic acid.

The inventive foam stabilizers from Example 8 and Example 9 are used here. These are silicone-polyether copolymers, the polyethers of which were completely or partly esterified with fatty acids under enzymatic catalysis.

A silicone-polyether copolymer in which the polyethers were esterified with acetic acid exclusively by methods known from the literature serves as a reference (Example 7).

The foams prepared were assessed on the basis of the following physical properties:
1) Sagging of the foam after the end of the rise phase (=collapse).
2) Foam density (FD)
3) The porosity, i.e. the air permeability, of the foam was determined by a dynamic pressure measurement on the foam. The measured dynamic pressure was stated in mm (water column), the lower dynamic pressure values then characterizing the more open foam. The values were measured in the range from 0 to 300 mm.
4) The cell structure is obtained from the qualitative optical comparison of the cell size distribution.
5) Number of cells/cm as well as the regularity of the cell structure obtained.

The following results were obtained:

TABLE 3

| 0.8 part of stabilizer | Collapse [cm] | Foam density [kg/m$^3$] | Porosity [mm water column] | Cell structure | Cell fineness [number of cells per cm] |
|---|---|---|---|---|---|
| Example 7 (reference) | −0.4 | 19.5 | 17 | regular | 11 |
| Example 8 | −0.3 | 19.3 | 15 | fine and regular | 13-14 |
| Example 9 | −0.3 | 19.3 | 12 | fine and regular | 13 |

TABLE 4

| 1.0 part of stabilizer | Collapse [cm] | Foam density [kg/m$^3$] | Porosity [mm water column] | Cell structure | Cell fineness [number of cells per cm] |
|---|---|---|---|---|---|
| Example 7 (Reference) | −0.1 | 19.3 | 39 | regular | 12 |
| Example 8 | −0.1 | 19.5 | 17 | fine and regular | 14 |
| Example 9 | 0.0 | 19.2 | 19 | fine and regular | 14 |

It is clear that the use of enzymatically esterified polyethers as a component of a flexible foam stabilizer has a surprisingly positive effect on the fine-celled character and regularity of the polyurethane foams obtained. Furthermore, the stabilizers according to the invention are distinguished by a broad processing latitude. While an increase in the amount of stabilizer from 0.8 part to 1.0 part results in an increase in the dynamic pressure in the case of the reference stabilizer, the porosity of the stabilizers according to the invention advantageously remains constant within the general variations of the measured values.

The invention claimed is:

1. A method of stabilizing foam, comprising:
utilizing a foam stabilizer of the general formula (I) in a preparation of a polyurethane foam, the general formula (I) being represented by:

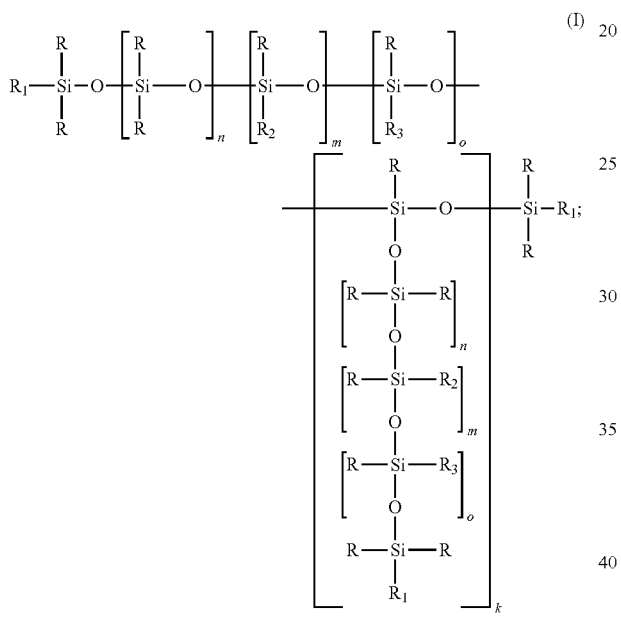

wherein n is 0-500;
wherein m is 1-60;
wherein o is 0-60;
wherein k is 0-10;
wherein R may be a linear, cyclic, or branched, aliphatic or aromatic, saturated or unsaturated hydrocarbon radical having 1 to 20 C atoms, which may contain heteroatoms;
wherein $R_1$ is R, $R_2$, or $R_3$;
wherein $R_2$ is $CH_2-CH_2-CH_2-O-(CH_2-CH_2O-)_x-(CH_2-CH(R'')O-)_y-C(O)R'$, in which R' represents the alkyl radical derived from monobasic fatty acids based on natural vegetable or animal oils having 6-30 carbon atoms;
wherein $R_3$ is one of:
$CH_2-CH_2-CH_2-O-(CH_2CH_2O-)_x-(CH_2-CH(R'')O-)_y-R'''$;
$CH_2-CH_2-CH_2-O-(CH_2-CH_2O-)_x-(CH_2-CH(R'')O-)_y-R'''$;
$CH_2-CH_2-CH_2-O-(CH_2-CH_2O-)_x-(CH_2-CH(R'')O-)_y-(SO)_z-R'''$;
$CH_2-R^{IV}$;
$CH_2-CH_2-(O)_{x'}-R^{IV}$;
$CH_2-CH_2-CH_2-O-CH_2-CH(OH)-CH_2OH$;

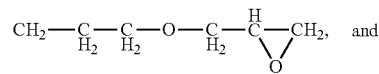

$CH_2-CH_2-CH_2-O-CH_2-C(CH_2OH)_2-CH_2-CH_3$;

wherein:
x is 0 to 100;
x' is 0 or 1;
y is 0 to 100;
z is 0 to 100;
R'' is an optionally substituted alkyl group having 1 to 4 C atoms;
R''' denotes a hydrogen radical, an alkyl group having 1 to 4 C atoms, the group $-C(O)-R''$, an alkylaryl group, or the group $-C(O)NH-R'$;
$R^{IV}$ denotes an optionally substituted, optionally halogen-substituted, hydrocarbon radical having 1 to 50 C atoms; and SO denotes the radical $-CH(C_6H_5)-CH_2-O-$.

2. The method according to claim 1;
wherein the foam stabilizer of the general formula (I) is utilized in the preparation of a rigid polyurethane foam.

3. The method according to claim 1;
wherein the foam stabilizer of the general formula (I) is utilized in the preparation of a polyester-polyurethane foam.

4. The method according to claim 1;
wherein the foam stabilizer of the general formula (I) is utilized in the preparation of a hot flexible polyurethane foam.

5. The method according to claim 1;
wherein the foam stabilizer of the general formula (I) is utilized in the preparation of an HR polyurethane foam.

6. The method according to claim 1;
wherein the foam stabilizer of the general formula (I) is utilized in a mixture with at least one conventional foam stabilizer prepared on the basis of petrochemical raw materials.

7. The method according to claim 1;
wherein the foam stabilizer of the general formula (I) is utilized in the preparation of the polyurethane foam in combination with at least one of an amine catalyst, a metal catalyst, a buffer substance, a crosslinking agent, an emulsifier, a flameproofing agent, an antioxidant, an antistatic agent, a biocide, a colour paste, and a solid filler.

8. The method according to claim 1;
wherein $R_2$ is $CH_2-CH_2-CH_2-O-(CH_2-CH_2O-)_x-(CH_2-CH(R'')O-)_y-C(O)R'$, in which R' represents the alkyl radical derived from monobasic fatty acids based on natural vegetable or animal oils having 8-22 carbon atoms.

9. The method according to claim 1;
wherein $R_2$ is $CH_2-CH_2-CH_2-O-(CH_2-CH_2O-)_x-(CH_2-CH(R'')O-)_y-C(O)R'$, in which R' represents the alkyl radical derived from monobasic fatty acids based on natural vegetable or animal oils, the monobasic fatty acids selected from the group consisting of:
caproic acid, caprylic acid, capric acid, lauric acid, myristic acid, palmitic acid, palmitoleic acid, isostearic acid, stearic acid, 12-hydroxystearic acid, dihydroxystearic acid, oleic acid, linoleic acid, petroselinic acid, elaidic acid, arachidic acid, behenic acid, erucic acid, gadoleic acid, linolenic acid, eicosapentaenoic acid, docosahexaenoic acid, and arachidonic acid, which can be used alone or as a mixture.

10. The method according to claim 1; wherein n is 0-79.

11. The method according to claim 1; wherein o is 1-60.

12. The method according to claim 1; wherein k is 1-10.

* * * * *